US012574410B2

(12) United States Patent
Kaidi

(10) Patent No.: US 12,574,410 B2
(45) Date of Patent: Mar. 10, 2026

(54) NETWORK-BASED SECURITY WITH DECOYS AND DECEPTIVE BALANCING

(71) Applicant: PAYPAL, INC., San Jose, CA (US)

(72) Inventor: George Chen Kaidi, Singapore (SG)

(73) Assignee: PAYPAL, INC., San Jose, CA (US)

( * ) Notice: Subject to any disclaimer, the term of this patent is extended or adjusted under 35 U.S.C. 154(b) by 148 days.

(21) Appl. No.: 18/073,193

(22) Filed: Dec. 1, 2022

(65) Prior Publication Data

US 2024/0187452 A1     Jun. 6, 2024

(51) Int. Cl.
*H04L 9/40*          (2022.01)
*G06F 21/62*         (2013.01)

(52) U.S. Cl.
CPC ...... *H04L 63/1491* (2013.01); *G06F 21/6245* (2013.01)

(58) Field of Classification Search
CPC .. G06F 21/554; G06F 21/566; G06F 21/6218; G06F 21/6245; H04L 63/1416; H04L 63/1491
See application file for complete search history.

(56) References Cited

U.S. PATENT DOCUMENTS

| | | | |
|---|---|---|---|
| 2015/0067885 A1* | 3/2015 | Kim .................... | H04L 12/1813 726/27 |
| 2024/0007285 A1* | 1/2024 | Albero ................ | G06F 21/6218 |

* cited by examiner

*Primary Examiner* — Kevin Bechtel
(74) *Attorney, Agent, or Firm* — Greenberg Traurig, LLP

(57) ABSTRACT

An example method includes receiving, from a user, a request to access a target document; determining that the request is unauthorized based on a characteristic of at least one of the user, the request, or the target document; in response to the determination, dynamically generating a decoy document and replacing the target document with the decoy document; and presenting the decoy document to the user, wherein the decoy document comprises an identical format to the target document.

19 Claims, 8 Drawing Sheets

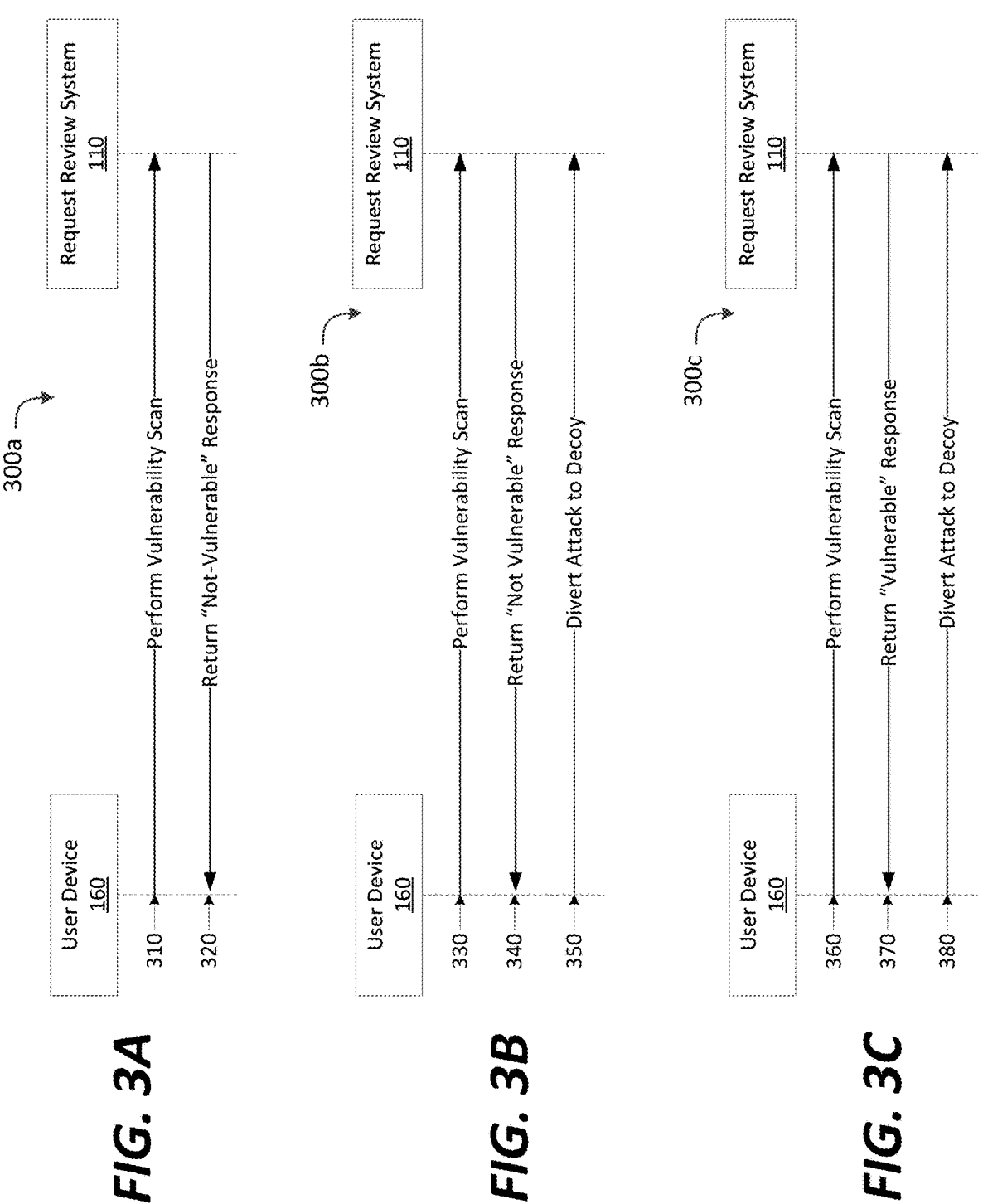

510 — Receiving Request to Access Target Document

520 — Determining That Request is Unauthorized

530 — Dynamically Generating Decoy Document and Replacing Target with Decoy

540 — Presenting Decoy Document to User

500

610 Receiving Request to Access Target Document

620 Determining That Request is Unauthorized

630 In Response to Determination, Granting User Access to Decoy Server

640 Tracking Pattern of Behavior of User in Decoy Server

600

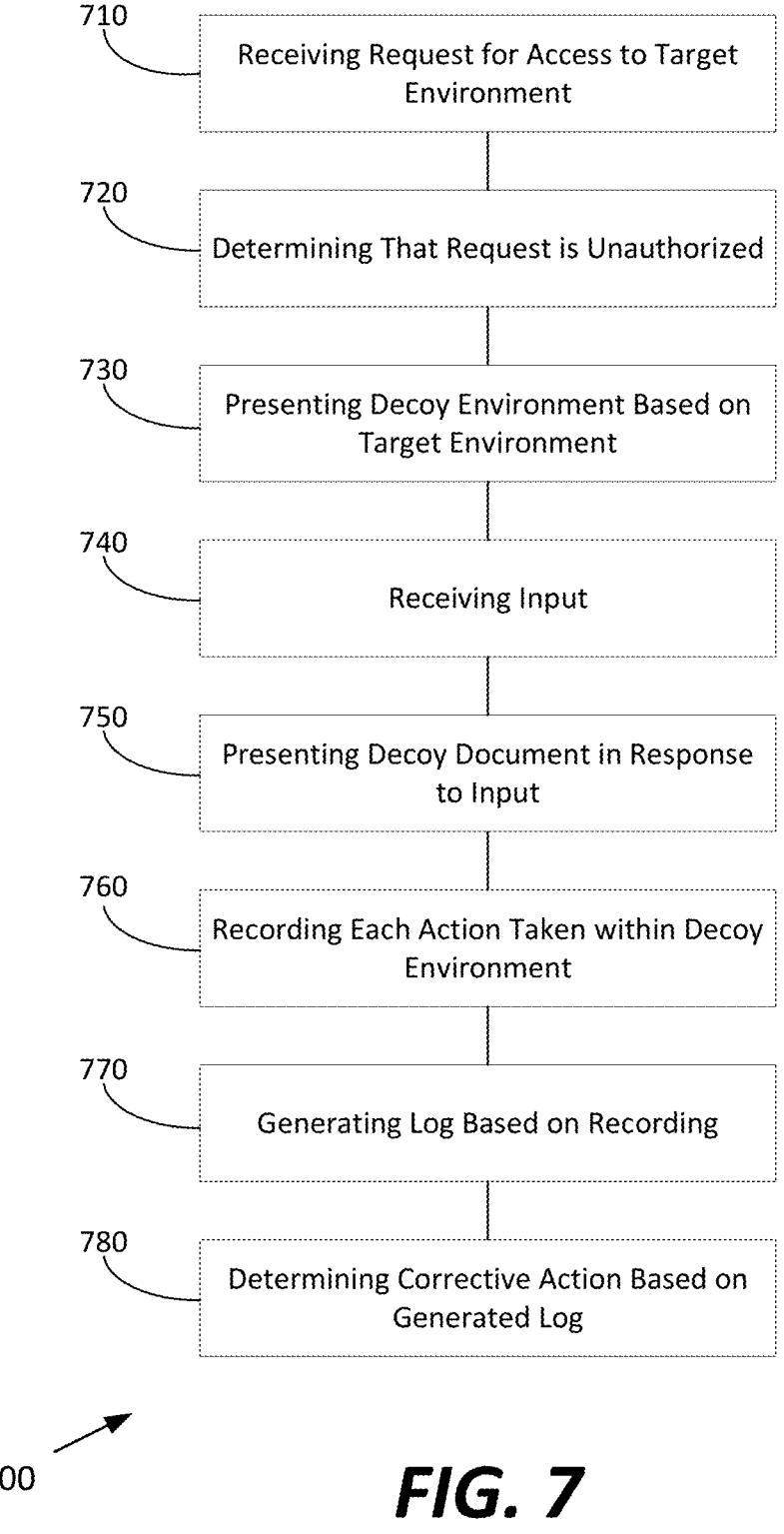

710 — Receiving Request for Access to Target Environment

720 — Determining That Request is Unauthorized

730 — Presenting Decoy Environment Based on Target Environment

740 — Receiving Input

750 — Presenting Decoy Document in Response to Input

760 — Recording Each Action Taken within Decoy Environment

770 — Generating Log Based on Recording

780 — Determining Corrective Action Based on Generated Log

NETWORK-BASED SECURITY WITH DECOYS AND DECEPTIVE BALANCING

TECHNICAL FIELD

The instant disclosure relates to protecting computing systems against unauthorized access through decoy documents and servers.

BACKGROUND

Most major data breaches involve or leverage lateral movement throughout a network. This lateral movement refers to a threat actor finding a single point-of-entry to a network and then moving within the network once inside, rather than trying to exploit multiple points-of-entry. Lateral movement techniques can be especially troublesome for large networks, as it can be difficult to protect against a cyberattack that exploits a single point-of-entry in a network with thousands of points-of-entry.

BRIEF DESCRIPTION OF THE DRAWINGS

FIG. 3A is a sequence diagram illustrating an example process of responding to a vulnerability scan.

FIG. 3B is a sequence diagram illustrating an example process of responding to a vulnerability scan.

FIG. 3C is a sequence diagram illustrating an example process of responding to a vulnerability scan.

FIG. 7 is a flow chart illustrating an example method of re-directing traffic to a decoy server and responding to actions in the decoy server.

DETAILED DESCRIPTION

Network-connected devices and systems that are connected to the internet are vulnerable to cyberattack from bad-faith or threat actors. Increasingly, these threat actors compromise a network by identifying a single point-of-entry, accessing the network via this single point-of-entry, and, once inside, expanding from the single point-of-entry to the network as a whole. This type of lateral movement is effective because it can be difficult for a network manager to maintain high-level security at every point-of-entry, particularly when maintaining such security requires employees to be diligent. Furthermore, although the single point-of-entry may not itself open up the entire network, internal firewalls that prevent access to some users within the network (e.g., low-level employees being unable to access employment files, etc.) are often significantly weaker than external firewalls.

As such, it is advantageous to provide an improved system for internal security that focuses on protecting a server or network from laterally-moving threat actors. This improved system may utilize a combination of decoy documents and decoy servers to trick threat actors into thinking that they are progressing through the server when, in fact, they are not. By leveraging these decoys rather than presenting a hard barrier (e.g., "Access Denied"), the threat actor is not alerted to the fact that they have been discovered, such that the threat actor continues to unproductively read through the decoy documents instead of attempting another method of ingress. Furthermore, because the improved system is aware of the threat actor and their movements within the server, the system may monitor and analyze the threat actor's actions to improve and refine its methods.

Figure 1:
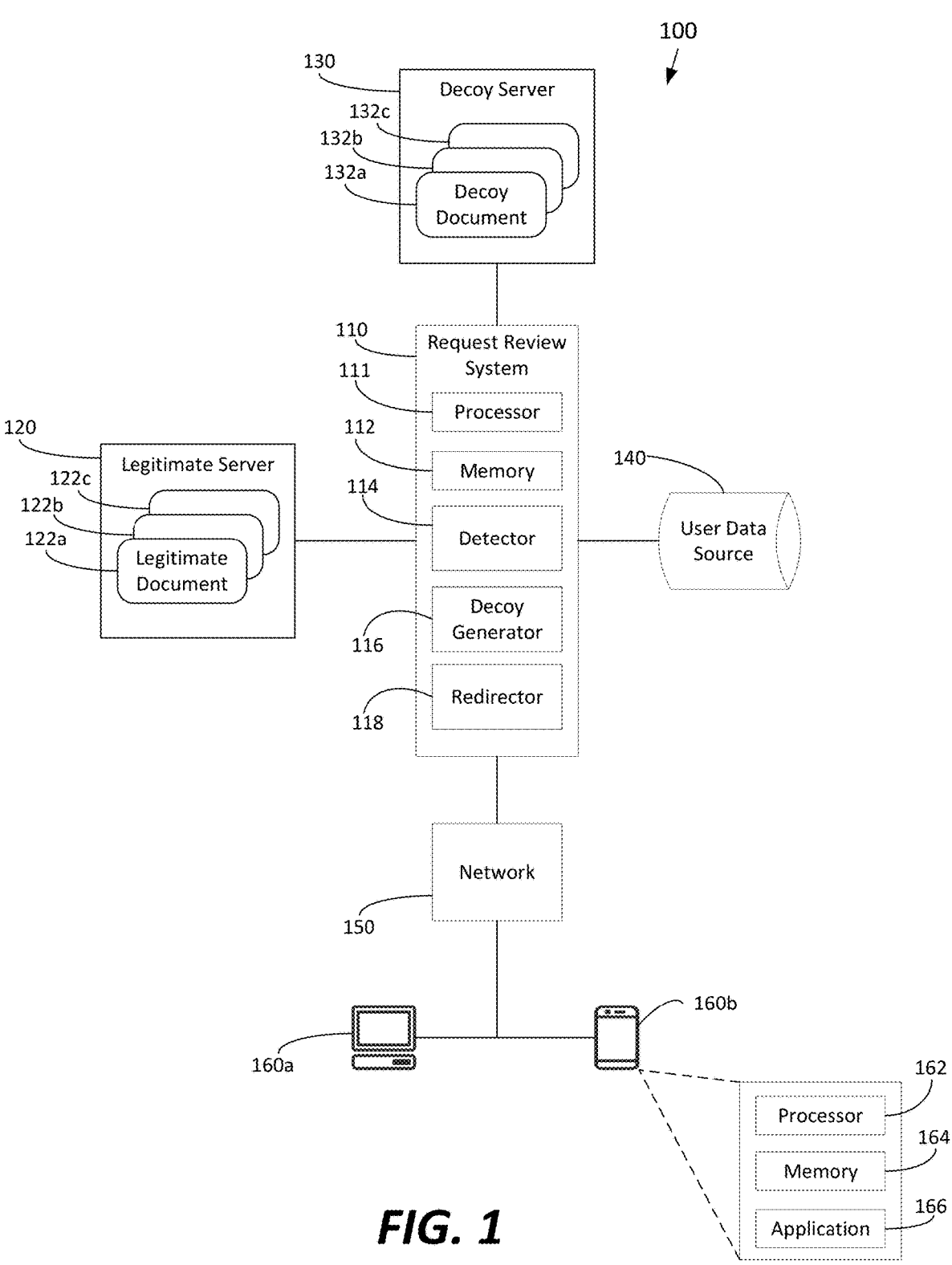
FIG. 1 is a block diagram view of an example system for generating decoy documents and redirecting traffic to the decoy documents.

Referring to the drawings, wherein like reference numerals refer to the same or similar features in the various views, FIG. 1 is a block diagram view of an example system 100 for protecting network security. The system 100 may include a request review system 110, a legitimate server 120, a decoy server 130, a user data source 140, and user computing devices including one or more personal computers 160a and one or more mobile computing devices 160b (which may be referred to collectively as the user computing devices 160 or individually as a user computing device 160). The request review system 110, the legitimate server 120, the decoy server 130, the user data source 140, and the user computing devices 160 may be in electronic communication with each other through a network 150.

The request review system 110 may include a processor 111 and a non-transitory, computer-readable memory 112 storing instructions that, when executed by the processor 111, cause the request review system 110 to perform one or more of the steps, processes, methods, operations, etc. described herein with respect to the request review system 110. The request review system 110 may provide a graphical user interface (GUI) for the user devices 160 that may enable the user to interact with one or more documents of the legitimate server 120 and/or the decoy server 130.

The legitimate server 120 may be a server that is actively used and maintained by an entity (e.g., company, individual, university, etc.) concerned with protecting information on the legitimate server 120. This information may include a first legitimate document 122a, a second legitimate document 122b, and a third legitimate document 122c (collectively "legitimate documents 122"). The legitimate server 120 may be any server capable of serving multiple clients (e.g., the user computing devices 160), and may be any type of server, such as an application server, database server, file server, etc. As such, even though reference is made throughout to the legitimate server 120 hosting legitimate documents 122, this disclosure should not be limited to the legitimate server 120 acting as a file server, and the legitimate documents 122 should not be limited to files. For example, the legitimate documents 122 may be server-based applications, databases, webpages, etc. The legitimate server 120 may be hosted on remote, physical hardware, or the legitimate server 120 may be a virtual server hosted by a hypervisor.

The decoy server 130 may be a server or computing environment that is generated and maintained by the request review system 110 to mirror or otherwise imitate the legitimate server 120. In this way, the decoy server 130 may include a first decoy document 132a, a second decoy document 132b, and a third decoy document 132c (collectively "decoy documents 132") that are configured to present as legitimate documents 122. As such, and as described in greater depth below, the decoy documents 132 may share formatting with the legitimate documents 122, and may be largely identical to the legitimate documents 122, with the exception of confidential or sensitive information, which is removed as part of the decoy generation process. The decoy documents 132, like the legitimate documents 122, may be files, server-based applications, databases, webpages, etc. In parallel, the decoy server 130 may similarly mirror the legitimate server 120, such that the decoy server 130 may look and respond to input in the same manner as the legitimate server 120. This similar mirroring may be from the appearance in the decoy server 130 of resources similar to those of the legitimate server 120 (e.g., network resources, web resources, computer resources, etc.) Due to the nature of the decoy server 130 as a form of cybersecurity protection (rather than as an operable server), the decoy server 130 may be a virtual server hosted by a hypervisor run by the request review system 110. Alternatively, the decoy server 130 may be a server hosted by physical hardware that is otherwise isolated from the rest of the system 100 to preserve security. In some embodiments, the decoy server 130 may not be a server and may instead include spoofed metadata that is presented in response to an attacker scan. The decoy server 130 may be an empty database instance on a database server, or may be a populated database instance. In other embodiments, such as the embodiment described herein in which the decoy server 130 is populated with decoy documents 132 by the decoy generator 116, the decoy server 130 is a heavily-populated database server with multiple databases.

Each user device 160 may include a processor 162 and a non-transitory, computer-readable memory 164 storing instructions that, when executed by the processor 162, cause the user device 160 to perform one or more of the steps, processes, methods, operations, etc. described herein with respect to the user device 160. As discussed above, the user device 160 may be configured to display a GUI that enables a user to interact with one or more legitimate documents 122 on the legitimate server 120 or one or more decoy documents 132 on the decoy server 130. The request review system 110 may support the user device 160 by determining whether the user device 160 is authorized to access the legitimate server 120, and re-directing the user device 160 to the decoy server 130 if not. In some embodiments, the user device 160 may store (in the memory 164) and execute an application 166 that may perform one or more of the decoy document operations of this disclosure. That is, decoy document operations described with respect to the request review system 110 may alternatively or additionally be performed locally on or by a user device 160—either on a user device 160 targeted by a bad actor, or on the user device 160 of a bad actor. For example, the application 166 may generate one or more decoy documents, may store legitimate versions of one or more documents for which decoy versions have been generated, may generate and display a decoy environment, and/or may track the user's activity within a decoy or legitimate environment or with respect to one or more decoy documents for analysis and adjustment of security protocols and procedures, either by the user device 160 or by the request review system 110 (e.g., with the user device 160 transmitting the tracked activity to the request review system 110). That is, the application 166 may be or may include a beacon program that is caused to be installed by the request review system 110 to track and report activity of a bad actor.

In another example, the application 166 may be or may include a lightweight offline module that generates decoy content before it is needed and may use such decoy content if, for example, an illicit login to the user device 160 is detected, even if the user device 160 does not have an active connection to the request review system 110. Alternatively, decoy content may be generated before it is needed by the request review system 110 and transmitted to the user device 160 for use by the application 166 if and when needed. In embodiments in which the application 166 stores and serves decoy files and/or other decoy information to the user of the mobile device 160, the state of the file may be stored by a state keeper module associated with the application, and the legitimate version of the file may be encrypted and stored in the memory 164.

The request review system 110 may further include a detector 114 configured to determine if a user device 160 is authorized to access the legitimate server 120. In some embodiments, the detector 114 may function as a gatekeeper, such that any request from the user device 160 to access the legitimate server 120 is routed through the detector 114, which evaluates the access request. The access request may include one or more credentials, which may be information regarding the user device 160 making the request, information regarding a particular legitimate document 122, and/or information particular to the access request itself (e.g., a timing of the access request, etc.).

In determining whether to grant the access request (and therefore allow the user device 160 to access one or more legitimate documents 122), the detector 114 may compare the one or more received credentials to stored credentials in the user data source 140. In an example in which the received credentials are user account data (e.g., username, password, access code, etc.), the stored credentials may be a list of user accounts with corresponding password data, such that the received user account data is compared to the list of user accounts to identify a match. In another example in which the received credentials are also a time at which the access request is made, the detector 114 may compare the time to a range of working hours associated with the stored credentials. If the time at which the access request is received is outside of the working hour range, the detector 114 may determine that the access request is unauthorized.

This comparison may also involve the particular legitimate document 122 included in the access request, as user credentials may enable access to certain documents but not others. For example, if the user credentials are for an employee with fewer access rights, the user credentials would not enable access to more sensitive business documents. As such, once the detector 114 has associated the received credentials with stored credentials, the detector 114 may compare the privileges associated with the stored credentials to the privilege required to access the particular legitimate document 122. The privilege required to access the particular legitimate document 122 may be embedded in metadata associated with the particular legitimate document 122, such that the detector 114 calls (or requests) the metadata upon receipt of the access request. If the received credentials do not match the stored credentials, or if the privileges associated with the stored credentials do not meet the required privileges for the particular legitimate document 122, the detector 114 may determine that the access request is unauthorized.

In some embodiments, the detector 114 may monitor activity of users in the legitimate server 120 to determine whether a user who may have been authorized to access some legitimate documents 122 is attempting to view documents to which the user is unauthorized. As described above, each legitimate document 122 may have an associated privilege, so the detector 114 may determine that an otherwise authorized user is conducting unauthorized activity based on an attempt (or repeated attempts) to access unauthorized documents. The detector 114 may deploy a threshold value, where an authorized user who makes a number of unauthorized access attempts that exceeds the threshold value may be re-classified by the detector 114 as an unauthorized user. The threshold value may therefore reduce a rate of false positive identifications by classifying a user as unauthorized only after multiple attempts, which may avoid a situation in which a user is classified as unauthorized after a typo or mis-click. For example, a single attempt or two attempts by a legitimate user to access a file for which the user lacks authorization may be due to user accident or confusion, three or more attempts may be characterized as an illicit attempt by the user to access the file, and the user may therefore be classified as an unauthorized user upon the third attempt to access a given file for which the user lacks access rights. The threshold value may be satisfied by unauthorized requests for multiple different documents (e.g., a script to brute force an entire directory).

Once the detector 114 determines that an access request and/or a user device 160 is unauthorized, the detector 114 may transmit and/or store an indication of the unauthorized request and/or user device 160. For example, the detector 114 may associate an Internet Protocol (IP) address from which the unauthorized request originated with an unauthorized 'flag' or 'tag,' such that future requests from the same IP address may be automatically (e.g., by the detector 114) determined to be unauthorized. Similarly, the detector 114 may flag a user account whose credentials were used as part of the access request with an unauthorized flag for future access requests with those credentials. These unauthorized flags or tags may be stored in the user data source 140.

The request review system 110 may further include a decoy generator 116 configured to generate one or more decoy documents 132 based on the determination from the detector 114. The decoy generator 116 may receive an indication from the detector 114 that the user device 160 is making an unauthorized access request, and may generate a decoy document 132 in response to the unauthorized access request. In particular, the decoy generator 116 may generate a decoy document 132 intended to mimic the particular legitimate document 122 that is the target of the unauthorized access request.

The decoy generator 116 may generate decoy documents 132 in three steps, in some embodiments: first, the decoy generator 116 may review the particular legitimate document 122 to identify sensitive data therein; second, the decoy generator 116 may generate decoy data to replace the sensitive data; third, the decoy generator 116 may generate the decoy document that includes non-sensitive information from the legitimate document 122 (e.g., excluding the sensitive information from the legitimate document 122) as well as the generated decoy data. In some embodiments, the sensitive data may be identified via internal labelling in document metadata when the legitimate document 122 is initially saved onto the legitimate server 120. For example, if the legitimate document 122 is saved by a user with the label "Financial Document," the metadata of the legitimate document 122 may include an indication that the legitimate document 122 contains sensitive data. The decoy generator 116 may conduct an initial review of the legitimate document 122 using a natural language processor configured to identify certain keywords pre-determined as being indicative of sensitive data. For example, the natural language processor may be programmed to look for words such as "confidential" or sequences of numbers having formats generally associated with telephone numbers (e.g., XXX-XXX-XXXX) or state-issued identification numbers (e.g., XXX-XX-XXXX).

In some embodiments, the decoy generator 116 may include a machine learning model trained to identify sensitive data in the legitimate document 122. The machine learning model may be trained using a batch set of legitimate documents 122 with various amounts of sensitive data. The machine learning model may also work in series with the natural language processor, such that the machine learning model receives the output of the natural language processor rather than the unprocessed legitimate document 122, which could supplement the initial training steps. In some embodiments, the machine learning model may be trained with feedback from previous unauthorized access requests. As discussed in greater depth below with regard to FIG. 4, the system 100 may monitor unauthorized users' actions within the decoy server 130, and the decoy generator 116 may utilize data derived from the monitoring to train the machine learning model. For example, if the monitoring indicates that unauthorized users often attempt to access a particular format of document (e.g., .jpeg), the decoy generator 116 may train the machine learning model to recognize sensitive document data using documents having that particular format.

Once the decoy generator 116 identifies sensitive data in the legitimate document 122, the decoy generator 116 may replace the sensitive data with decoy data. The decoy data may be generated based on the sensitive data, such that the decoy data have a same format, style, or form as the sensitive data. For example, if the sensitive data are telephone numbers, the decoy generator 116 may generate decoy data in the form of telephone numbers, albeit with different numbers. For numerical data (e.g., telephone numbers) or alpha-numerical data (e.g., serial numbers), the decoy generator 116 may utilize a random number generator (RNG) to generate the decoy data. For alphabetical data (e.g., names, instructions), the decoy generator 116 may utilize a pre-determined list or set of words to replace the sensitive data. The decoy generator 116 may use a machine learning model (either a separate machine learning model or a sub-function of the machine learning model trained to initially recognize the sensitive data) to determine which word(s) from the pre-determined list are similar to or interchangeable with the sensitive data. The decoy generator 116 may identify individual characters, letters, words, terms, groups of words, clauses, phrases, sections, paragraph, and any other collection of one or more characters and words for replacement with decoy data.

When replacing sensitive data with decoy data, the decoy generator 116 may log or otherwise track the decoy data that are used for the replacement, and may associate the decoy data, the sensitive data, and the received credentials associated with the unauthorized access request in storage (e.g., memory 112). By maintaining a record of what decoy data were used to replace which sensitive data for which unauthorized user, the decoy generator 116 may generate consistent decoy documents 132 for the unauthorized user, such that the unauthorized user is not alerted to the decoy-nature of the decoy documents 132 by inconsistent or misaligned decoy data. For example, if the decoy generator 116 replaces the name of Person A in the first decoy document 132*a* with Decoy Name A but replaces the name of Person A in the second decoy document 132*b* with Decoy Name B, an observant unauthorized user may notice the inconsistency and realize that the data are falsified.

The request review system 110 may further include a redirector 118 configured to re-direct a user device 160 if the user device 160 is determined (e.g., by the detector 114) to be unauthorized. In some embodiments, the redirector 118 may replace the legitimate document 122 that is the target of the unauthorized access request with the corresponding decoy document 132, such that the user device 160 is allowed to access the legitimate server 120 but is viewing or presented with a decoy document 132. In these embodiments, the legitimate document 122 may be moved to and stored in a separate location or database (e.g., the user data source 140). By moving the legitimate document 122 to a separate and secure location, the unauthorized user is unable to access the sensitive data therein, despite the unauthorized user being allowed to access the legitimate server 120. If the user device 160 attempts to navigate to legitimate documents 122 in the legitimate server 120 from the decoy document 132, the redirector 118 may direct the user device to the decoy server 130. Alternatively, the decoy generator 116 may continue generating decoy documents 132 in response to the user device 160 navigating, and the redirector 118 may continue replacing the selected legitimate documents 122 with newly-generated decoy documents 132. The decision by the request review system 110 as to whether to continue generating decoy documents 132 or to re-direct the user device 160 to the decoy server 130 may be based on a threshold value, where the request review system 110 re-directs the user device 160 once the user device 160 has requested a number of legitimate documents 122 that exceeds the threshold value. As an alternative to moving the legitimate document when generating the decoy document, the legitimate document may remain in the same location on the legitimate server 120. For example, the decoy document may be stored as a separate version of the legitimate document. In either embodiment, subsequent authorized users that access the legitimate server 120 may be served the legitimate document, either from the location to which the legitimate document has been moved or from the version history of the document.

The decoy generator 116 may also embed a beacon or other piece of tracking metadata (e.g., a cookie) in the decoy document 132. In this way, if the unauthorized user downloads (e.g., exfiltrates) the decoy document 132, the request review system 110 may track and continue to monitor the unauthorized user, even after the unauthorized user is no longer active in the system 100.

In some embodiments, the redirector 118 may immediately direct the user device 160 to the decoy server 130, such that the user device 160 is presented with the decoy document 132 corresponding to the requested legitimate document 122, but is not otherwise granted access to the legitimate server 120. In these embodiments, the user device 160 may navigate to other decoy documents 132 in the decoy server 130, and may do so without further authentication or analysis by the detector 114. Furthermore, the decoy generator 116 may not continue generating decoy documents 132 and may instead populate the decoy server 130 with previously-generated decoy documents 132. This functionality is described in greater depth below with regard to FIG. 4.

The user data source 140 may include information about a plurality of users of the legitimate server 120, including user account details, user privileges, user working hours, etc. The user data source 140 may also include information about one or more unauthorized users, as determined by the request review system 110. As shown in FIG. 1, the user data source 140 is in communication with the request review system 110, such that the request review system 110 may receive information from the user data source 140 and may send (e.g., update) information in the user data source 140. For example, the request review system 110 may retrieve information from the user data source 140 to determine whether received credentials match stored credentials, and may then update the information in the user data source 140 to reflect a determination that the associated user account is attempting unauthorized access.

As noted above, the instant disclosure is not limited to use in connection with file servers. For example, in some embodiments, the request review system 110 may be used in connection with an end-user application and, in response to an unauthorized user attempting to access sensitive information associated with an account, the request review system 110 may replace the user's account information with decoy account information. In such an example, the unauthorized user may be one that accessed an account with a password that has been reported as stolen, that accessed the account with a brute-force password hack that exceeds a threshold number of login attempts, etc.

Figures 2A, 2B:
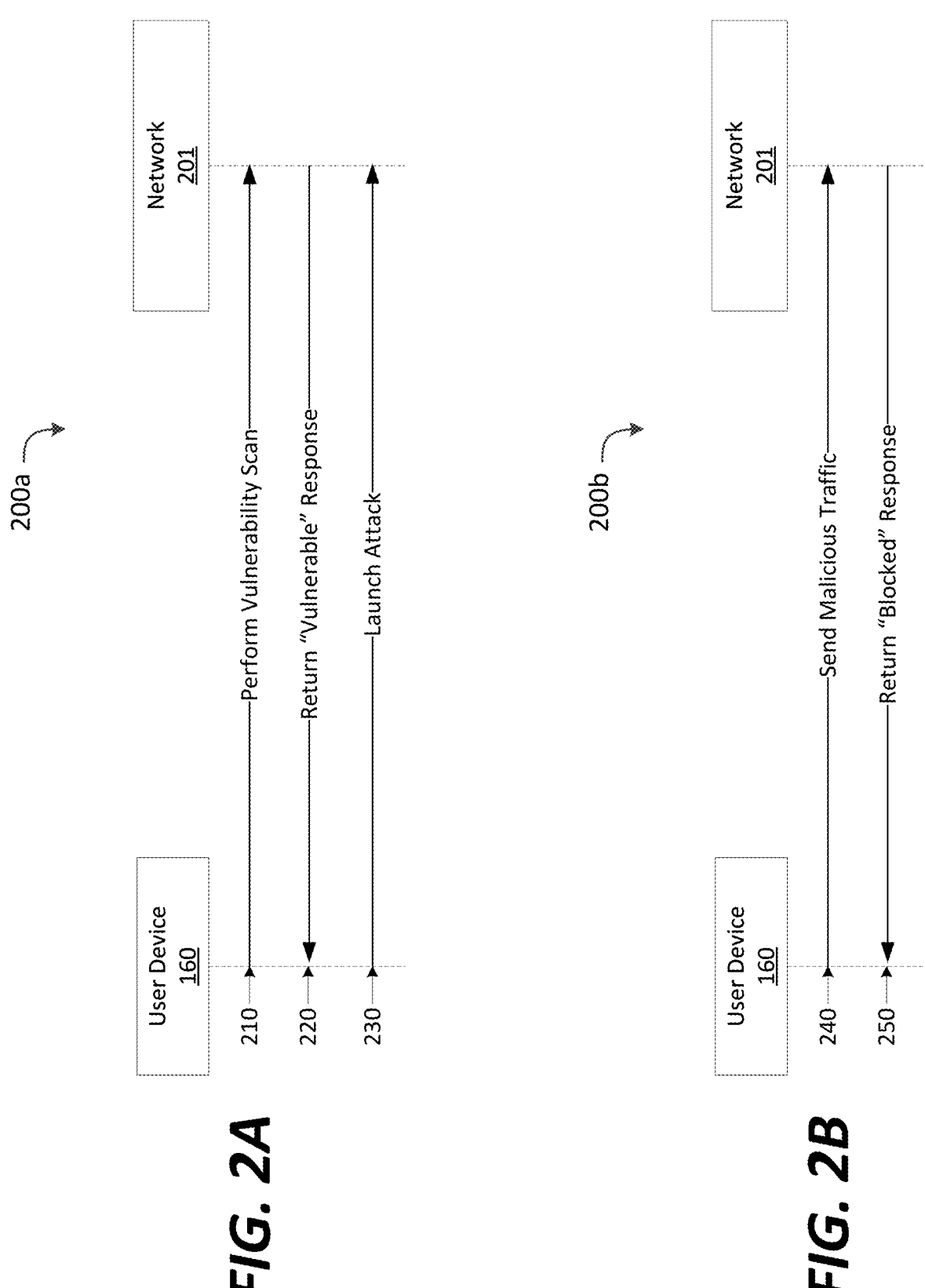
FIG. 2A is a sequence diagram illustrating an example process of responding to a vulnerability check.
FIG. 2B is a sequence diagram illustrating an example process of responding to malicious traffic.

FIG. 2A is a sequence diagram illustrating an example process 200a of responding to a vulnerability check. The process 200a may involve a user client device 160 of an unauthorized user and a network 201. The network 201 may be any suitable network that hosts multiple computing systems and/or servers, and that is vulnerable to threat actors (e.g., the request review system 110 is omitted).

The process 200a may include, at operation 210, the unauthorized user's device 160 performing a vulnerability scan on the network 201, which is a known approach of bad actors for attempting to access secured systems. The vulnerability scan may involve a program run by the user device 160 that is configured to assess the network 201 for known weaknesses. Generally speaking, a vulnerability scan may function by identifying and generating a list of all systems and devices connected to the target network. For each identified system or device, the vulnerability scan may attempt to identify, for example, the operating system being run, any installed software, any open ports, any associated user accounts, and/or any other attributes of the system or device. From there, the vulnerability scan may compare this compiled list of system attributes to a list of known vulnerabilities (e.g., a particular operating system is known to be vulnerable to brute force access).

More targeted vulnerability scans may focus on particular components within the network 201. For example, the vulnerability scan may be a directory traversal, in which "../" may be added to a path address (e.g., "example.com/web-path/page1/../../../etc/passwd") to generate a response from the network 201 in the form of a status code. If the response from the network 201 includes a status code '200' and the default page of the path address (e.g., "example.com"), or if the network 201 returns a status code '403' or a status code that is not '200', the response would indicate to the user device 160 that the network 201 is not vulnerable to this particular vulnerability. Alternatively, if the network 201 responds with status code '200' and the actual file at the end of the path address (e.g., "/etc/passwd"), this would indicate to the user device 160 that the network 201 is vulnerable to this particular vulnerability. A Local File Inclusion (LFI) scan works in a similar fashion.

In another example, the vulnerability scan may utilize an Insecure Direct Object Reference (IDOR), in which the user device 160 initially enters the network 201 as a valid (or authorized) user but then attempts to reach an unauthorized page (e.g., an admin page at "example.com/admin-panel").

If the attempt is successful (e.g., the network 201 returns the admin page), that indicates to the user device 160 that the network 201 is vulnerable to IDOR. Alternatively, if the network 201 returns a '404' status, or otherwise redirect the user back to home page, then the network 201 indicates to the user device 160 that the network is not vulnerable.

In another example, the vulnerability scan may utilize Out-of-Band Application Security Testing (OAST), in which an external listener is used to monitor network 201 activity for callbacks on domains that are maliciously injected into the network 201. If the network 201 performs a callback (e.g., responds to) for one or more of the maliciously-injected domains, the network 201 is revealed to be vulnerable. Alternatively, if the network 201 does not perform a callback, there is no indication to the user device 160 that the network 201 is vulnerable.

In another example, the vulnerability scan could be a Blind Structured Query Language (SQL) injection, in which the user device 160 presents the network 201 with a question in SQL. If the network 201 returns a true or false answer in response to the question, that would indicate that the network 201 is vulnerable. Alternatively, if the network 201 does not respond at all (e.g., times out), the network 201 does not appear as vulnerable. For an example involving a blind time-based SQL injection, an inferential technique that relies on sending an SQL query to the database that forces the database to wait for a specified amount of time (in seconds) before responding. The response time may indicate to the attacker whether the result of the query is TRUE (e.g., relatively short time) or FALSE (e.g., relatively long time). In a similar example, the vulnerability scan may utilize exploit scripts that are available publicly. Many of these scripts (e.g., in Metasploit) would expect two types of outputs, and depending on the return from the network 201, the user device 160 could determine whether the network 150 is vulnerable.

Once the user device 160 performs the vulnerability scan at operation 210, the network 201 may return a vulnerable response at operation 220 (e.g., one of the responses noted above as indicating a weakness or vulnerability). Because the network 201 does not include the request review system 110, the vulnerable response may be genuine and unplanned (e.g., the network 201 is truly vulnerable). From there, the user device 160 may launch an attack at operation 230 based on the determined vulnerability.

FIG. 2B is a sequence diagram illustrating an example process 200b of responding to malicious traffic. The process 200b may involve a user client device 160 and the network 201. The network 201 may be any suitable network that hosts multiple computing systems and/or servers, and that is vulnerable to threat actors (e.g., the request review system 110 is omitted).

The process 200b may include, at operation 240, the user device 160 sending malicious traffic into the network 201. In some examples, rather than first performing a vulnerability scan (e.g., via process 200a), the user device 160 may immediately send malicious traffic at the network 201 in an attempt to brute force the network 201. This malicious traffic may include a form of Hypertext Transfer Protocol (HTTP) traffic from non-browser applications that attempt to connect to so-called "bad URLs" (e.g., command and control servers), or any other suitable tool, script, or protocol that an attacker may use to exploit a vulnerability.

The process 200b may then include, at operation 250, the network 201 returning a "blocked" response to the user device 160. In this example, the network 201 has a generally-functional that determines the incoming traffic to be malicious and blocks it accordingly. While this may initially be a positive response, particularly in the short-term, as it means that the malicious traffic is prevented from entering the network 201, this blocked response provides a clue or indication to the threat actor operating the user device 160. Like with the vulnerability scan of process 200a, a blocked response informs the threat actor that this particular point-of-entry into the network 201 is not vulnerable, or that the network 201 is not vulnerable to this particular type of malicious traffic. The threat actor may then be able to try a different method of attack based on this new information.

FIG. 3A is a sequence diagram illustrating an example process 300a of responding to a vulnerability scan. The process 300a may involve a user device 160 operated by a threat actor and the request review system 110. The user device 160 may be attempting to access the legitimate server 120, and the request review system 110 may intercept the traffic and act as a gateway.

The process 300a may include, at operation 310, the user device 160 performing a vulnerability scan that is received by the request review system 110. This operation 310 may be substantially similar to the performance at operation 210 of the process 200a.

In contrast to the network 201 of process 200a, the request review system 110 returns, at operation 320, a "not-vulnerable" response. As described above, in an example in which the vulnerability scan is a directory traversal, this not-vulnerable response could include the request review system returning a status code '200' and the default page of the path included in the vulnerability scan. Because the request review system 110 may be configured to determine that the vulnerability scan is a vulnerability scan and not a legitimate access request (e.g., via the detector 114), the request review system 110 may return a not-vulnerable response in all circumstances—even when the underlying legitimate server 120 (or network) would be vulnerable in theory.

FIG. 3B is a sequence diagram illustrating an example process 300b of responding to a vulnerability scan. The process 300b may involve a user device 160 operated by a threat actor and the request review system 110. The user device 160 may be attempting to access the legitimate server 120, and the request review system 110 may intercept the traffic and act as a gateway.

The process 300b may include, at operation 330, the user device 160 performing a vulnerability scan that is received by the request review system 110. This operation 330 may be substantially similar to the performance at operation 310 of the process 300a. The process 300b may also include, at operation 340, the request review system 110 returning a "not vulnerable" response to the user device. This operation 330 may be substantially similar to the performance at operation 320 of the process 300b.

In contrast to the process 300a at which the user device 160 stops after receiving the not vulnerable response at operation 320, the process 300b may include, at operation 350, the user device 160 launching an attackthat is diverted by the request review system 110 to a decoy. As discussed above with reference to the decoy generator 116 and the redirector 118, the operation 350 may include generating and displaying a decoy document 132, or may include diverting the user device 160 to the decoy server 130.

FIG. 3C is a sequence diagram illustrating an example process 300c of responding to a vulnerability scan. The process 300c may involve a user device 160 operated by a threat actor and the request review system 110. The user device 160 may be attempting to access the legitimate server 120, and the request review system 110 may intercept the traffic and act as a gateway.

The process 300c may include, at operation 360, the user device 160 performing a vulnerability scan that is received by the request review system 110. This operation 360 may be substantially similar to the performance at operation 310 of the process 300a and operation 330 of the process 300b.

In contrast to either process 300a or process 300b, the process 300c may also include, at operation 370, the request review system 110 returning a "vulnerable" response to the user device 160. Although this may appear counter-intuitive, given that a vulnerable response essentially functions as an invitation for a threat actor, the process 300c may include, at operation 380, the request review system 110 diverting the subsequent attack from the user device 160 to a decoy. As described above with reference to operation 350, the decoy may be one or more decoy documents 132 or may be the decoy server 130. By appearing to the threat actor as vulnerable and instead diverting the threat actor to a decoy generated by the request review system 110, the system 100 may stifle the threat actor's progress. In contrast to a situation in which the threat actor receives a "blocked response" and takes that as a challenge to attempt different methods of attack, the apparent success in the process 300c tricks the threat actor into thinking that they have been successful, and draws their attention and efforts towards useless decoy documents 132.

Figure 4:
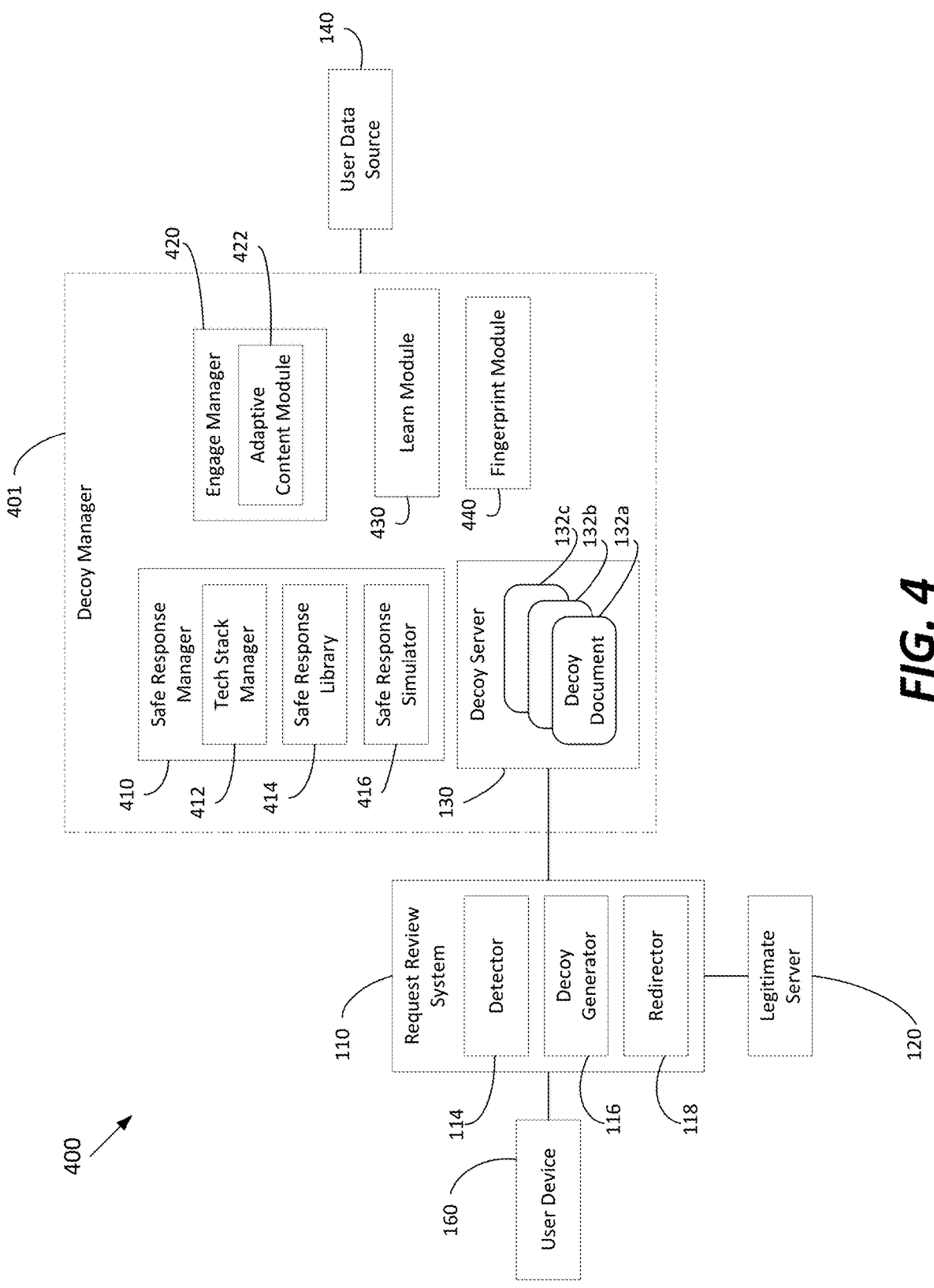
FIG. 4 is a block diagram view of an example system for managing decoy documents.

FIG. 4 is a block diagram view of an example system 400 for managing decoy documents. The system 400 shares components with the system 100 of FIG. 1, such that like-numbered components should be taken as identical for both systems 100 and 400. System 400 further includes a decoy manager 401. The decoy manager 401 may be in network communication with the request review system 110 and the user data source 140, and may be configured to manage, alter, and otherwise adjust the decoys utilized by the request review system 110 in response to threat actors. The decoy manager 401 may include the decoy server 130 and associated decoy documents 132, a safe response manager 410, an engage manager 420, a learn module 430, and a fingerprint module 440.

The safe response manager 410 may be configured to generate, store, and manage one or more responses to be made by the request review system 110 after receiving a vulnerability scan, malicious traffic, or other cybersecurity attack from a threat actor. For example, the safe response manager 410 may generate the "not vulnerable" response transmitted by the request review system 110 at operations 320 and 340. The safe response manager 410 may include a tech stack manager 412, a safe response library 414, and a safe response simulator 416.

The tech stack manager 412 may be configured to track and maintain a log of internal components that comprise the legitimate server 120, as well as the systems 100, 400 generally. Because many types of cyber-attacks (e.g., vulnerability scans) target specific components, it is important that the tech stack manager 412 maintain an accurate and up-to-date record of the specific components in the systems 100, 400 so that the request review system 110 may respond to cyber-attacks in an accurate manner. For example, if a vulnerability scan is directed to a component of the legitimate server 120 that is well-known to be vulnerable to the particular type of vulnerability scan, a "not-vulnerable" response would be suspicious. By maintaining a list of components and their vulnerabilities, the tech stack manager

412 is aware of the expected "vulnerable" response and may inform the request review system 110.

The safe response library 414 may maintain a database of previously-generated and transmitted responses to vulnerability scans. The safe response simulator 416 may be a serverless service that simulates a virtualized environment of the tech stack of the systems 100, 400 that can be utilized to generate appropriate responses for various cyber-attacks. The safe response simulator 416 may utilize the log generated and maintained by the tech stack manager 412.

The engage manager 420 may be configured to generate and maintain the content presented to an unauthorized user, and may include an adaptive content module 422. Particularly in those embodiments in which the redirector 118 directs the unauthorized user device 160 to the decoy server 130 for further monitoring, the engage manager 420 may configured to continually adapt and respond to the user device 160 activity to maintain the façade of the decoy server 130.

The adaptive content module 422 may be configured to receive an indication of the user device 160 activity within the decoy server 130 (or within the legitimate server 120 if the unauthorized user is being presented with decoy documents 132 within the legitimate server 120) and to instruct the request review system 110, and particularly the decoy generator 116, on response strategies. As such, the adaptive content module 422 may monitor the specific documents with which the user device 160 interacts, the contents of the interacted documents, the pattern of interactions, etc. For example, the adaptive content module 422 may determine that the user device 160 is focusing on documents that would appear to contain password data, and may instruct the decoy generator 116 to focus on identifying and replacing password data in legitimate documents 122.

The learn module 430 may be configured to monitor user device 160 activity within the decoy server 130 (or within the legitimate server 120 if the unauthorized user is being presented with decoy documents 132 within the legitimate server 120) and to log the user device 160 activity. From there, the learn module 430 may analyze the patterns of activity and use this analysis to improve or adjust performance of the request review system 110. In particular, the learn module 430 may improve the detection capabilities of the detector 114, not only with regard to the initial detection of unauthorized access requests but also with the re-classification of authorized users as unauthorized based on their activity within the legitimate server 120. The learn module 430 may generate training data for a machine learning model included in the detector 114, or may provide direct rules and feedback for the detector 114 based on previous decisions by the detector 114 and analysis by the learn module 430. The learn module 430 may also provide feedback and adjustment to the Safe Response Manager 410.

The fingerprint module 440 may monitor all unauthorized access requests and activity in order to generate a list or log of threat actors, which can be utilized to track known threat actors, inform further security measures, and serve as a record in case of legal proceedings. In addition to generating a list or log, the fingerprint module 440 may determine or derive a profile (e.g., "fingerprint") of each threat actor. This profile may include document tendencies, timings, access methodologies, geolocation, or any other characteristic that could be used to identify and combat future threat actors.

Figure 5:
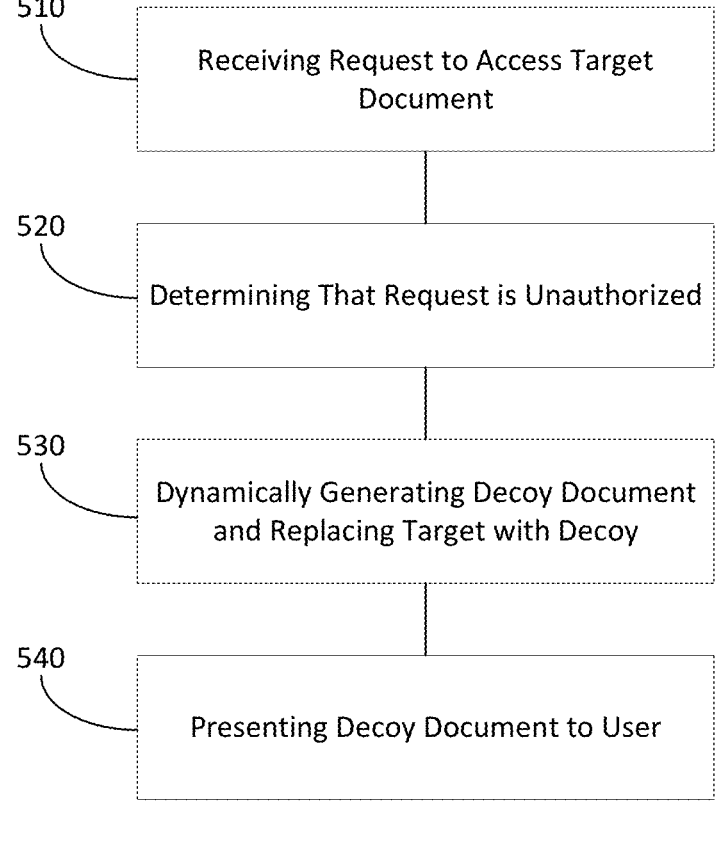
FIG. 5 is a flow chart illustrating an example method of generating decoy documents and redirecting traffic to the decoy documents.

FIG. 5 is a flow chart illustrating an example method 500 of generating decoy documents and redirecting traffic to the decoy documents. The method 500, or one or more portions of the method 500, may be performed by the request review system 110, in some embodiments.

The method 500 may include, at block 510, receiving a request to access a target document. The request may be received from a user device and may include, for example, credentials, which may be information regarding the user device making the request (e.g., a user login identity, an IP address, etc.), information regarding a particular target document, and/or information particular to the access request itself (e.g., a timing of the access request, etc.).

The method 500 may also include, at block 520, determining that the request is unauthorized. Block 520 may include, for example, comparing received credentials to stored credentials respective of one or more users. In an example in which the received credentials are user account data (e.g., username, password, access code, etc.), the stored credentials may be a list of user accounts with corresponding password data, such that the received user account data is compared to the list of user accounts to identify a match. In another example in which the received credentials are also a time at which the access request is made, block 520 may include comparing the time to a range of working hours associated with the stored credentials and/or received credentials. If the time at which the access request is received is outside of the working hour range, the detector 114 may determine that the access request is unauthorized.

In some embodiments, block 520 may further include comparing the target document to the credentials, as user credentials may enable access to certain documents but not others. If the received credentials do not match the stored credentials, or if the privileges associated with the stored credentials do not meet the required privileges for the target document 122, the access request may be determined to be unauthorized.

The method 500 may further include, at block 530, dynamically generating a decoy document and replacing the target document with the decoy document. Generating the decoy document may include, for example, identifying sensitive data in the target document, generating decoy data to replace the sensitive data, and creating a decoy document that does include non-sensitive information from the target document, does not include the sensitive information from the legitimate document 122, and does include the generated decoy data in place of the removed sensitive data. The decoy document at block 530 may be generated in response to the user request to access the target document.

The method 500 may further include, at block 540, presenting the decoy document to the user. Block 540 may include, for example, removing the legitimate document from the legitimate server and placing the decoy document in the legitimate server in place of the legitimate document, such that the user sees the decoy document in the directory or other listing of the contents of the legitimate server. Additionally or alternatively, block 540 may include transmitting the decoy document itself to the user's computing device for display on the user's computing device.

Figure 6:
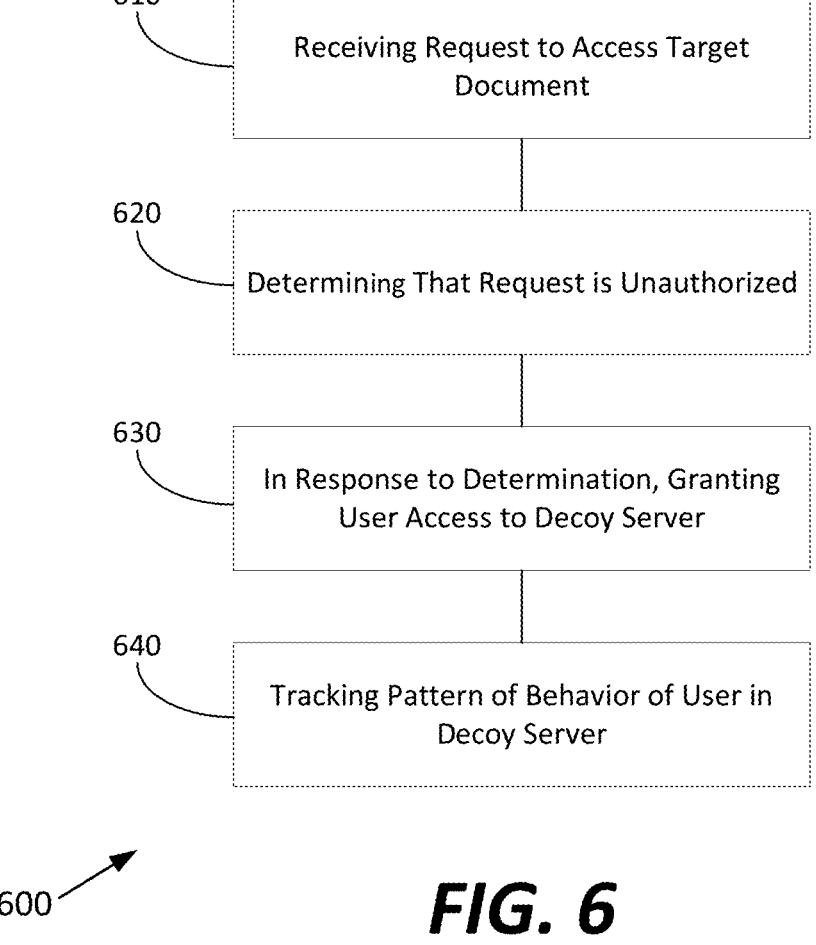
FIG. 6 is a flow chart illustrating an example method of re-directing traffic to a decoy server.

FIG. 6 is a flow chart illustrating an example method 600 of re-directing traffic to a decoy server. The method 600, or one or more portions of the method 600, may be performed by the request review system 110, in some embodiments.

The method 600 may include, at block 610, receiving a request to access a target document and, at block 620, determining that the request is unauthorized. Blocks 610 and 620 may be substantially similar to blocks 510 and 520 of FIG. 5.

The method 600 may further include, at block 630, granting the user access to a decoy server in response to the determination that the request is unauthorized. The decoy server may mirror or otherwise imitate a legitimate server that stores the target document requested by the user. Accordingly, the decoy server may store a plurality of decoy documents that share formatting with the documents of the legitimate server, including a decoy version of the target document. The decoy documents may be identical to the files on the legitimate server, but for the removal of sensitive data that is replaced with decoy data. Additionally or alternatively, one or more decoy files may include no legitimate data, but would be of a type and have contents of a type that would be expected by the user in the decoy server. In some embodiments, the files in the decoy server may be generated dynamically in response to the user request for the target document. In other embodiments, the decoy server and the decoy files in the decoy server may be pre-existing (e.g., in embodiments in which the data in the legitimate server is of sufficient sensitivity that an attempted incursion is foreseeable).

The method 600 may further include, at block 640, tracking a pattern of behavior of the user in the decoy server. For example, the user's clicks or other commands within the decoy server may be received and logged. Additionally or alternatively, the decoy files opened by the user, and/or which portions of the decoy files are viewed by the user, may be determined and logged. Additionally or alternatively, a beacon or other piece of tracking metadata (e.g., a cookie) placed in a decoy document may have been downloaded by the user from the decoy server, and block 640 may include receiving data back from the beacon or other tracking metadata. Such information may include, for example, information respective of the user's computing system that may be used to identify the unauthorized user or to determine if the unauthorized user again attempts unauthorized access to the legitimate server.

In some embodiments, tracking at block 640 may be performed for the session of the bad actor in which the bad actor user is initially diverted to the decoy server. In some embodiments, tracking at block 640 may additionally or alternatively tracking the bad actor user's activities in future sessions on the decoy server and/or other environments. Furthermore, in embodiments in which tracking occurs locally on the user client device 160, tracked activity may be transmitted from the user device 160 to the request review system 110 and/or decoy manager 401 for analysis and/or learning continuously, on a batched basis (e.g., scheduled, when the user device 160 next attempts to access the legitimate server 120, and/or on a scheduled, regular basis.

FIG. 7 is a flow chart illustrating an example method 700 of re-directing traffic to a decoy server and responding to actions in the decoy server. The method 700, or one or more portions of the method 700, may be performed by the request review system 110, in some embodiments.

The method 700 may include, at block 710, receiving a request to access a target environment and, at block 720, determining that the request is unauthorized. Blocks 710 and 720 may be substantially similar to blocks 510 and 520, in embodiments, except the target environment may be a target server, rather than a target document, and thus comparisons at block 720 may be respective of authorization to access the server or a directory, rather than to access a single document. Alternatively, in some embodiments, the request to access may be or may include a vulnerability check from the user.

The method 700 may further include, at block 730, presenting a decoy environment based on the target environment in response to the determination that the request is unauthorized. For example, block 730 may include presenting a decoy server as discussed above with respect to block 630.

The method 700 may further include, at block 740, receiving an input. The input may be received from the same user from which the request at block 710 was received. The input may be, for example, a selection of a particular document within the decoy environment, a search query within the decoy environment, a directory navigation or other navigation command within the decoy environment, etc.

The method 700 may further include, at block 750, presenting a decoy document in response to the input. Block 750 may include, for example, presenting the decoy document in the directory or other listing of the contents of the decoy server. Additionally or alternatively, block 750 may include transmitting the decoy document itself to the user's computing device for display on the user's computing device. Additionally or alternatively, block 750 may include presenting a listing of one or more documents, summary or snippets of the contents of one or more documents, or other compilation of one or more documents that includes the decoy document along with one or more other decoy documents.

The method 700 may further include, at block 760, recording each action taken within the decoy environment. For example, the input received at block 740 may be recorded, along with any additional document selections, searches, commands, etc. entered by the user within the decoy environment. The user's actions may be recorded by the system providing the decoy server, and/or may be recorded by tracking software on the user's computing device provided by the system providing the decoy server. If locally tracked (e.g., on the user's computing device), the tracked actions may be transmitted back to the system providing the decoy server, at the direction of the tracking software or in response to a request from the decoy server or another server associated with the system providing the decoy server (e.g., upon a subsequent attempt to access the target environment by the user computing device or by the user on another computing device).

The method 700 may further include, at block 770, generating a log based on the recorded actions. The log may include, for example, a listing and sequence of all user actions, the times of those actions, the source of those actions, and/or the responsive action by the decoy environment to each user action.

The method 700 may further include, at block 780, determining a corrective action based on the generated log. For example, the corrective action may include generating additional decoy documents for the decoy environment, which may include retrieving documents from the target environment, determining one or more portions of the documents that include sensitive data, generating decoy data based on the sensitive data, and generating the additional decoy documents by replacing the sensitive data with the decoy data. In an embodiment, the corrective action may include returning a non-vulnerable response to the user.

Figure 8:
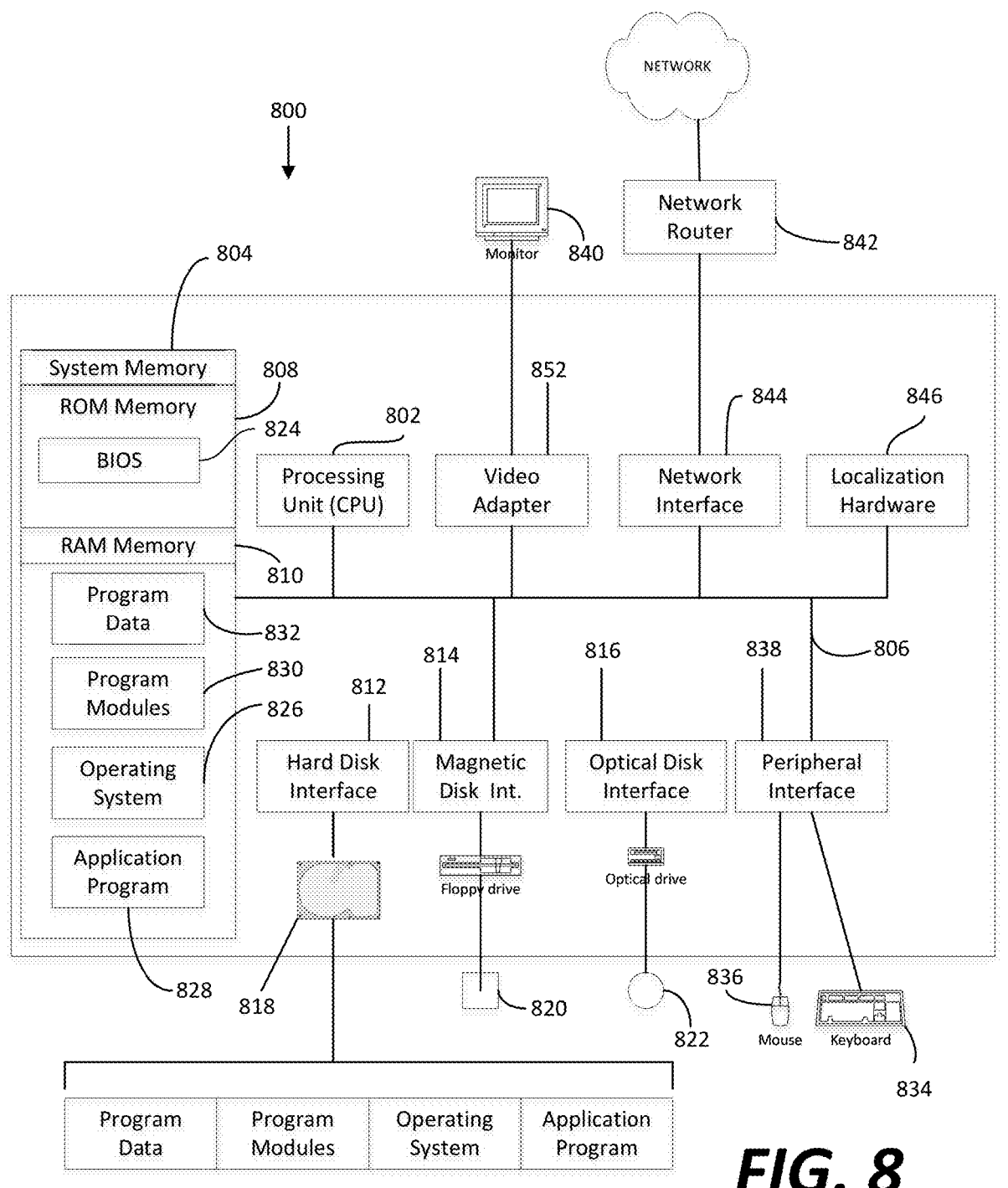
FIG. 8 is a diagrammatic view of an example computing system.

FIG. 8 is a block diagram of an example computing system, such as a desktop computer, laptop, smartphone, tablet, or any other such device having the ability to execute instructions, such as those stored within a non-transient, computer-readable medium. Furthermore, while described and illustrated in the context of a single computing system 800, those skilled in the art will also appreciate that the various tasks described hereinafter may be practiced in a distributed environment having multiple computing systems 800 linked via a local or wide-area network in which the executable instructions may be associated with and/or executed by one or more of multiple computing systems 800.

In its most basic configuration, computing system environment 800 typically includes at least one processing unit 802 and at least one memory 804, which may be linked via a bus 806. Depending on the exact configuration and type of computing system environment, memory 804 may be volatile (such as RAM 810), non-volatile (such as ROM 808, flash memory, etc.) or some combination of the two. Computing system environment 800 may have additional features and/or functionality. For example, computing system environment 800 may also include additional storage (removable and/or non-removable) including, but not limited to, magnetic or optical disks, tape drives and/or flash drives. Such additional memory devices may be made accessible to the computing system environment 800 by means of, for example, a hard disk drive interface 812, a magnetic disk drive interface 814, and/or an optical disk drive interface 816. As will be understood, these devices, which would be linked to the system bus 806, respectively, allow for reading from and writing to a hard disk 818, reading from or writing to a removable magnetic disk 820, and/or for reading from or writing to a removable optical disk 822, such as a CD/DVD ROM or other optical media. The drive interfaces and their associated computer-readable media allow for the nonvolatile storage of computer readable instructions, data structures, program modules and other data for the computing system environment 800. Those skilled in the art will further appreciate that other types of computer readable media that can store data may be used for this same purpose. Examples of such media devices include, but are not limited to, magnetic cassettes, flash memory cards, digital videodisks, Bernoulli cartridges, random access memories, nanodrives, memory sticks, other read/write and/or read-only memories and/or any other method or technology for storage of information such as computer readable instructions, data structures, program modules or other data. Any such computer storage media may be part of computing system environment 800.

A number of program modules may be stored in one or more of the memory/media devices. For example, a basic input/output system (BIOS) 824, containing the basic routines that help to transfer information between elements within the computing system environment 800, such as during start-up, may be stored in ROM 808. Similarly, RAM 810, hard drive 818, and/or peripheral memory devices may be used to store computer executable instructions comprising an operating system 826, one or more applications programs 828, other program modules 830, and/or program data 832. Still further, computer-executable instructions may be downloaded to the computing environment 800 as needed, for example, via a network connection. The applications programs 828 may include, for example, a browser, including a particular browser application and version, which browser application and version may be relevant to determinations of correspondence between communications and user URL requests, as described herein. Similarly, the operating system 826 and its version may be relevant to determinations of correspondence between communications and user URL requests, as described herein.

An end-user may enter commands and information into the computing system environment 800 through input devices such as a keyboard 834 and/or a pointing device 836. While not illustrated, other input devices may include a microphone, a joystick, a game pad, a scanner, etc. These and other input devices would typically be connected to the processing unit 802 by means of a peripheral interface 838 which, in turn, would be coupled to bus 806. Input devices may be directly or indirectly connected to processor 802 via interfaces such as, for example, a parallel port, game port, firewire, or a universal serial bus (USB). To view information from the computing system environment 800, a monitor 840 or other type of display device may also be connected to bus 806 via an interface, such as via video adapter 852. In addition to the monitor 840, the computing system environment 800 may also include other peripheral output devices, not shown, such as speakers and printers.

The computing system environment 800 may also utilize logical connections to one or more computing system environments. Communications between the computing system environment 800 and the remote computing system environment may be exchanged via a further processing device, such a network router 842, that is responsible for network routing. Communications with the network router 842 may be performed via a network interface component 844. Thus, within such a networked environment, e.g., the Internet, World Wide Web, LAN, or other like type of wired or wireless network, it will be appreciated that program modules depicted relative to the computing system environment 800, or portions thereof, may be stored in the memory storage device(s) of the computing system environment 800.

The computing system environment 800 may also include localization hardware 846 for determining a location of the computing system environment 800. In embodiments, the localization hardware 846 may include, for example only, a GPS antenna, an RFID chip or reader, a WiFi antenna, or other computing hardware that may be used to capture or transmit signals that may be used to determine the location of the computing system environment 800. Data from the localization hardware 846 may be included in a callback request or other user computing device metadata in the methods of this disclosure.

The computing system, or one or more portions thereof, may embody a user computing device 160, in some embodiments. Additionally or alternatively, some components of the computing system 800 may embody the request review system 110, decoy server 130, and/or legitimate server 120, decoy server 130, and/or decoy manager 401. For example, the request review system 110 and/or decoy manager 401 may be instantiated on one or more servers that each include one or more CPUs 802, RAM memories 810, hard disk drives 818, and one or more network interfaces 844. The legitimate server 120 may be, for example, instantiated in a cloud server that includes one or more CPUs 802, RAM memories 810, hard disk drives 818, and one or more network interfaces 844. In some embodiments, the decoy server 130 may be implemented as a virtual server, e.g., as a partition on one or more physical servers that include one or more CPUs 802, RAM memories 810, hard disk drives 818, and one or more network interfaces 844.

Methods and systems according to the present disclosure may have numerous applications. For example, by leveraging two separate sources of authentication information for approving access, the methods described herein provide an additional layer of security. Having one of those sources be a distributed ledger further secures the process, and builds on the inherent security and immutability of a distributed ledger. In those embodiments in which the third party system is providing a service to the user, authentication by an intermediary streamlines the process for both transactors, as the intermediary (e.g., the application described herein) consolidates the necessary security measures onto a single party, such that neither transactor has to supply their own security or risk-reduction measures. This consolidation provides a technical solution to an internet-centric problem, as all internet-based transactions are exposed to additional risks that may be alleviated by the methods herein.

In some embodiments, a non-transitory computer readable medium stores program instructions that, when executed by a processor, cause a computer system to perform operations including receiving, from a user, a request to access a target document, determining that the request is unauthorized based on a characteristic of at least one of the user, the request, or the target document, in response to the determination, dynamically generating a decoy document and replacing the target document with the decoy document, and presenting the decoy document to the user. Here, the decoy document comprises an identical format to the target document.

In some of these embodiments, the target document is moved to an isolated database in response to the replacement.

In some of these embodiments, the non-transitory, computer-readable medium of claim 1, stores further instructions that, when executed by the processor, cause the computer system to perform further operations that include retrieving the target document from a legitimate server, determining a portion of the target document that comprises sensitive data, generating decoy data based on the sensitive data, and generating the decoy document by replacing the sensitive data with the decoy data.

In some of these embodiments, the decoy data is generated using a trained algorithm that incorporates feedback from at least one previous unauthorized request. In other of these embodiments, the decoy data is generated based on an access privilege associated with the user. In some of these embodiments, one or more characteristics of the decoy data are associated with the user and are used to generate consistent decoy data upon subsequent access requests by the user, the consistent decoy data having the one or more characteristics associated with the user.

In some of these embodiments, the characteristic comprises an access privilege associated with the user, an access level required for the target document, a first pattern of behavior of the user during a first session in which the request is received, or a second pattern of behavior of the user during a second session prior to the first session.

In some of these embodiments, the request is a first request and the target document is a first target document, and wherein the computer-readable medium further stores instructions that, when executed by the processor, cause the computer system to perform further operations that include receiving, from the user, a second request to access a second target document, determining that the second request is unauthorized based on a second characteristic of at least one of the user, the second request, or the second target document, and in response to the determination, presenting a second decoy document to the user. Here, the second decoy document comprises an identical format to the second target document, the decoy document comprises a first decoy document, and the second decoy document comprises similar content to the first decoy document.

In some of these embodiments, generating the decoy document further comprises assigning a unique identifier to the decoy document, the unique identifier indicative of the user requesting access to the target document and of a time of the access request.

In some of these embodiments, the non-transitory, computer-readable medium stores further instructions that, when executed by the processor, cause the computer system to perform further operations that include in response to the determination that the access request is unauthorized, tagging the user as malicious to automatically flag any subsequent interaction by the user as unauthorized.

In other embodiments, a non-transitory computer readable medium stores program instructions that, when executed by the processor, cause a computer system to perform operations that include receiving, from a user, a request to access a target document, determining that the request is unauthorized based on a characteristic of at least one of the user, the request, or the target document, in response to the determination, granting the user access to a decoy server, and tracking a pattern of behavior of the user in the decoy server. Here, the decoy server comprises a decoy document comprising an identical format to the target document, and at least one filler document that is associated with the target document.

In some of these embodiments, the request comprises a vulnerability check. Here, the medium stores further instructions that, when executed by a processor, cause the computer system to perform further operations that include spoofing a response to the vulnerability check, and presenting the spoofed response to the user, the spoofed response indicative of a non-vulnerable result. In some of these embodiments, the non-transitory, computer-readable medium stores further instructions that, when executed by the processor, cause the computer system to perform further operations that include generating an audit log based on the tracked pattern of behavior.

In some of these embodiments, the non-transitory, computer-readable medium stores further instructions that, when executed by the processor, cause the computer system to perform further operations that include analyzing the tracked pattern of behavior using a trained algorithm, determining a corrective action based on the analysis, and implementing the corrective action.

In some of these embodiments, the corrective action comprises generating additional filler documents in the decoy server. In other of these embodiments, the decoy server is configured to have substantially similar or substantially identical metadata to a legitimate server to appear to the user as the legitimate server.

In further embodiments, a system for presenting a decoy document in response to a request for access to a target server includes a processor, and a memory storing instructions that, when executed by the processor, cause the computer system to receive the request, determine that the request is unauthorized, present a decoy environment based on the target environment, receive an input, present a decoy document in response to the input, the decoy document configured to prompt further interaction within the decoy environment, record each interaction taken within the decoy environment, generate a log based on the recorded interactions, and determine a corrective action based on the generated log.

In some of these embodiments, the corrective action comprises generating additional decoy documents for the decoy environment. In other of these embodiments, generating the additional decoy documents comprises retrieving documents from the target environment, determining a portion of the documents that comprises sensitive data, generating decoy data based on the sensitive data, and generating the additional decoy documents by replacing the sensitive data with the decoy data.

In some of these embodiments, the request for access comprises a vulnerability check, and the corrective action comprises returning a non-vulnerable response to the user.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various presently disclosed embodiments. It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or otherwise understood to one of ordinary skill in the art.

What is claimed is:

1. A non-transitory, computer-readable medium storing program instructions that, when executed by a processor, cause a computer system to perform operations comprising:

receiving, from a user, a request to access a target document;

determining that the request is unauthorized based on a characteristic of at least one of the user, the request, or the target document;

in response to the determination, dynamically generating a decoy document and replacing the target document with the decoy document, wherein a decoy data in the decoy document is generated using a trained algorithm that incorporates feedback data determined to be from at least one previous unauthorized request; and presenting the decoy document to the user, wherein the decoy document comprises an identical format to the target document.

2. The non-transitory, computer-readable medium of claim 1, wherein the target document is moved to an isolated database in response to the replacement.

3. The non-transitory, computer-readable medium of claim 1, storing further instructions that, when executed by the processor, cause the computer system to perform further operations comprising:

retrieving the target document from a legitimate server;

determining a portion of the target document that comprises sensitive data;

generating the decoy data based on the sensitive data; and generating the decoy document by replacing the sensitive data with the decoy data.

4. The non-transitory, computer-readable medium of claim 3, wherein the decoy data is generated based on an access privilege associated with the user.

5. The non-transitory, computer-readable medium of claim 4, wherein one or more characteristics of the decoy data are associated with the user and are used to generate consistent decoy data for the decoy document, wherein the consistent decoy data is stored in a log so that consistent decoy documents including the consistent decoy data are generated upon subsequent access requests by the user based on the log, the consistent decoy data having the one or more characteristics associated with the user.

6. The non-transitory, computer-readable medium of claim 1, wherein the characteristic comprises:

an access privilege associated with the user;

an access level required for the target document;

a first pattern of behavior of the user during a first session in which the request is received; or a second pattern of behavior of the user during a second session prior to the first session.

7. The non-transitory, computer-readable medium of claim 1, wherein the request is a first request and the target document is a first target document, and wherein the computer-readable medium further stores instructions that, when executed by the processor, cause the computer system to perform further operations comprising:

receiving, from the user, a second request to access a second target document;

determining that the second request is unauthorized based on a second characteristic of at least one of the user, the second request, or the second target document; and in response to the determination, presenting a second decoy document to the user, wherein:

the second decoy document comprises an identical format to the second target document, the decoy document comprises a first decoy document, and the second decoy document comprises similar content to the first decoy document.

8. The non-transitory, computer-readable medium of claim 1, wherein generating the decoy document further comprises assigning a unique identifier to the decoy document, the unique identifier indicative of the user requesting access to the target document and of a time of the access request.

9. The non-transitory, computer-readable medium of claim 1, storing further instructions that, when executed by the processor, cause the computer system to perform further operations comprising:

in response to the determination that the access request is unauthorized, tagging the user as malicious to automatically flag any subsequent interaction by the user as unauthorized.

10. A non-transitory, computer-readable medium storing program instructions that, when executed by a processor, cause a computer system to perform operations comprising:

receiving, from a user, a request to access a target document;

determining that the request is unauthorized based on a characteristic of at least one of the user, the request, or the target document;

in response to the determination, granting the user access to a decoy server; and tracking a pattern of behavior of the user in the decoy server, wherein the decoy server comprises:

a decoy document comprising an identical format to the target document, wherein the decoy document is generated using feedback data determined to be from at least one previous unauthorized request; and at least one filler document that is associated with the target document.

11. The non-transitory, computer-readable medium of claim 10, wherein the request comprises a vulnerability check, and wherein the medium stores further instructions that, when executed by the processor, cause the computer system to perform further operations comprising:

spoofing a response to the vulnerability check; and presenting the spoofed response to the user, the spoofed response indicative of a non-vulnerable result.

12. The non-transitory, computer-readable medium of claim 10, storing further instructions that, when executed by the processor, cause the computer system to perform further operations comprising:

generating an audit log based on the tracked pattern of behavior.

13. The non-transitory, computer-readable medium of claim 10, storing further instructions that, when executed by the processor, cause the computer system to perform further operations comprising:

analyzing the tracked pattern of behavior using a trained algorithm;

determining a corrective action based on the analysis; and implementing the corrective action.

14. The non-transitory, computer-readable medium of claim 13, wherein the corrective action comprises generating additional filler documents in the decoy server.

15. The non-transitory, computer-readable medium of claim 10, wherein the decoy server is configured to have substantially identical metadata to a legitimate server to appear to the user as the legitimate server.

16. A computer system for presenting a decoy document in response to a request for access to a target server, the system comprising:

a processor; and a memory storing instructions that, when executed by the processor, cause the computer system to:

receive, from a user, the request to access a target document;

determine that the request is unauthorized based on a characteristic of at least one of the user, the request, or the target document;

in response to the determination, dynamically generate the decoy document and replace the target document with the decoy document, wherein a decoy data in the decoy document is generated using a trained algorithm that incorporates feedback data determined to be from at least one previous unauthorized request, and wherein the decoy document comprises an identical format to the target document;

present a decoy environment based on a target environment, the decoy environment including the decoy document;

receive an input;

present the decoy document to the user in response to the input, the decoy document configured to prompt further interaction within the decoy environment;

record each interaction taken within the decoy environment;

generate a log based on the recorded interactions; and determine a corrective action based on the generated log.

17. The system of claim 16, wherein the corrective action comprises generating additional decoy documents for the decoy environment.

18. The system of claim 17, wherein generating the additional decoy documents comprises:

retrieving documents from the target environment;

determining a portion of the documents that comprises sensitive data;

generating decoy data based on the sensitive data; and generating the additional decoy documents by replacing the sensitive data with the decoy data.

19. The system of claim 16, wherein:

the request for access comprises a vulnerability check, and the corrective action comprises returning a non-vulnerable response to the request.

* * * * *